(12) United States Patent
Perry et al.

(10) Patent No.: US 9,162,799 B2
(45) Date of Patent: Oct. 20, 2015

(54) STORAGE CONTAINER AND IDENTIFICATION SYSTEM

(71) Applicants: Heather M. Perry, Frisco, TX (US); William D. Perry, Frisco, TX (US)

(72) Inventors: Heather M. Perry, Frisco, TX (US); William D. Perry, Frisco, TX (US)

(*) Notice: Subject to any disclaimer, the term of this patent is extended or adjusted under 35 U.S.C. 154(b) by 22 days.

(21) Appl. No.: 14/014,353

(22) Filed: Aug. 30, 2013

(65) Prior Publication Data
US 2015/0060319 A1    Mar. 5, 2015

(51) Int. Cl.
*B65D 25/20*    (2006.01)
*G09F 3/20*    (2006.01)
*B65D 21/02*    (2006.01)
*G06Q 10/08*    (2012.01)

(52) U.S. Cl.
CPC .............. *B65D 25/205* (2013.01); *G09F 3/208* (2013.01); *A47B 2210/19* (2013.01); *B65D 21/023* (2013.01); *B65D 21/0219* (2013.01); *B65D 2203/12* (2013.01); *B65D 2251/1083* (2013.01); *B65D 2543/00564* (2013.01); *G06Q 10/087* (2013.01); *G09G 2370/022* (2013.01)

(58) Field of Classification Search
CPC .................................................. B65D 25/205
USPC ........................................... 40/374, 313, 312
See application file for complete search history.

(56) References Cited

U.S. PATENT DOCUMENTS

| | | | |
|---|---|---|---|
| 1,150,852 A | | 8/1915 | Davidson |
| 1,184,549 A * | | 5/1916 | McClung ...................... 220/525 |
| 2,623,660 A * | | 12/1952 | Irving ............................ 222/131 |
| 3,136,412 A | | 6/1964 | Karosen |
| 4,485,923 A * | | 12/1984 | Schwaikert .................... 206/508 |
| 4,911,296 A * | | 3/1990 | Hart, Jr. ......................... 206/373 |
| 5,275,277 A * | | 1/1994 | Gallegos ........................ 206/217 |
| 5,285,900 A * | | 2/1994 | Swingler ....................... 206/508 |
| 5,353,948 A * | | 10/1994 | Lanoue et al. ................. 220/826 |
| 5,630,512 A * | | 5/1997 | Wells ............................. 206/776 |
| 5,704,193 A | | 1/1998 | Roe |
| 6,022,145 A | | 2/2000 | Searfoss |
| 6,364,096 B1 * | | 4/2002 | De Baets et al. ............... 206/1.5 |
| 6,527,121 B1 | | 3/2003 | Flynn |
| 6,749,064 B1 | | 6/2004 | Alrey |
| 6,761,266 B2 * | | 7/2004 | Popish ............................ 206/38 |
| 6,905,043 B2 * | | 6/2005 | Zilberman ..................... 220/665 |
| 8,333,296 B1 * | | 12/2012 | Fung ......................... 220/592.17 |
| 2005/0211601 A1 | | 9/2005 | Ferris |
| 2006/0054674 A1 | | 3/2006 | Meyer |
| 2006/0059756 A1 | | 3/2006 | Wells |
| 2009/0020444 A1 | | 1/2009 | Green |
| 2010/0314268 A1 | | 12/2010 | Goodman |
| 2011/0233096 A1 * | | 9/2011 | Michels et al. ............ 206/459.5 |

FOREIGN PATENT DOCUMENTS

DE    202010001795 U1 *    8/2010    ............. B65D 25/20

* cited by examiner

*Primary Examiner* — Anthony Stashick
*Assistant Examiner* — Mollie Llewellyn
(74) *Attorney, Agent, or Firm* — Law Office of Jeff Williams; J. Oliver Williams

(57) ABSTRACT

In the present application, a storage container is configured to provide a sealed portion for the storage of identification material. The storage container includes a container for holding various elements and a sleeve coupled to the container. The sleeve has an opening to accept the identification material. The sleeve is configured to be selectively sealed such that the interior of the sleeve is isolated from the interior of the container and the exterior of the container.

9 Claims, 8 Drawing Sheets

STORAGE CONTAINER AND IDENTIFICATION SYSTEM

BACKGROUND

1. Field of the Invention

The present application relates generally to storage containers and, more particularly, to improved means of identification of goods within the storage containers.

2. Description of Related Art

The market generally provides a wide variety of options with respect to storage containers. Storage containers are available in multiple sizes, colors, and materials. Storage containers are used to store a variety of items from simple household items to commercial goods. The specific type of container is a selected by looking at a number of factors, such as the user's requirements, the weight of items to be stored, and the storage environment (temperature, humidity . . . ) for example. After goods or items are stored, identifying the contents can be troublesome without opening the container.

In order to provide ways of identifying the contents within storage containers, a number of options presently exist. First, containers are sometimes made with transparent material to permit a user to see within the container. When the container is at eye-level, peering into the container can be relatively simple. However, as the container moves away from eye-level, the change in viewing angle distorts the contents and makes identification difficult or impossible.

Secondly, clear panes of glass or transparent plastic material may be used in selected locations. Even more drastically than the previous example, the view angle is critical in viewing inside the container to identify the contents.

Thirdly, a more primitive means of identification is to attach a label or photograph of the contents directly to the container. Often this is done with adhesive to an external surface. Other times this is done by draping a hanging apparatus over a lip of the container with a slot to hold the label or photograph. Although this is easily changeable and more visible from different viewing angles, the hangers or labels are easily damaged and susceptible to premature accidental removal.

Additionally, when labels or photographs are used to provide a more visible view angle, the label or photograph is susceptible to damage from the environment. An example would be rain, spills, sun light, temperature or humidity. If mounted internally, fumes or moisture from within the container may cause premature damage. An improved storage container with identification system is required to improve the longevity, useful life, and total cost of ownership of the storage container.

Although great strides have been made in content identification within storage containers, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
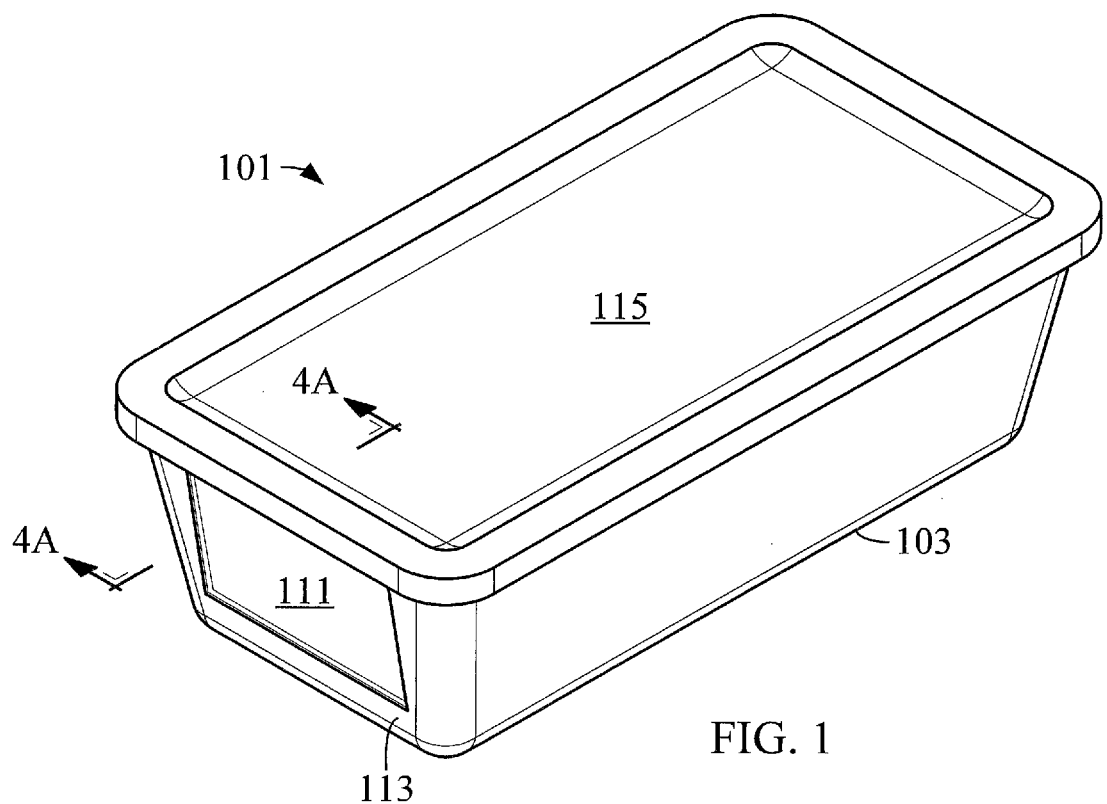
FIG. 1 is a perspective view of a storage container according to the preferred embodiment of the present application.
Figure 2:
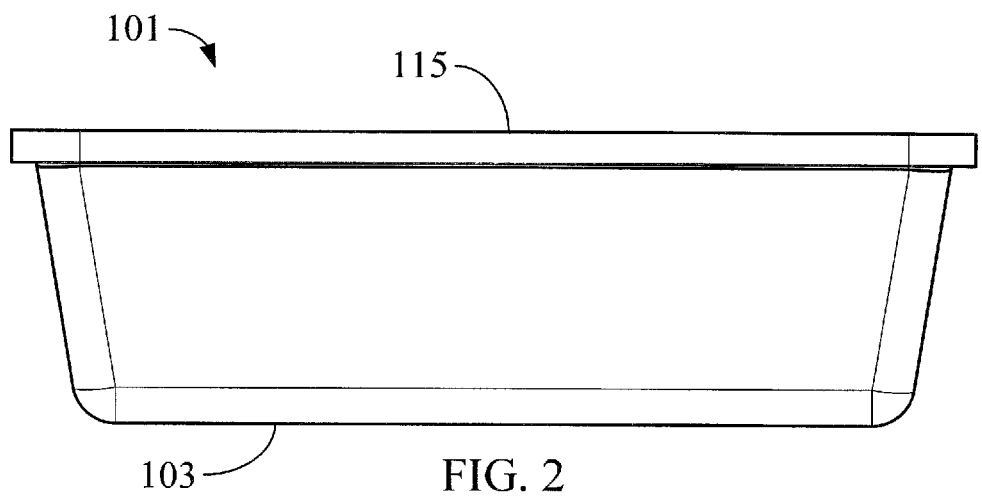
FIG. 2 is a side view of the storage container of FIG. 1.
Figure 3:
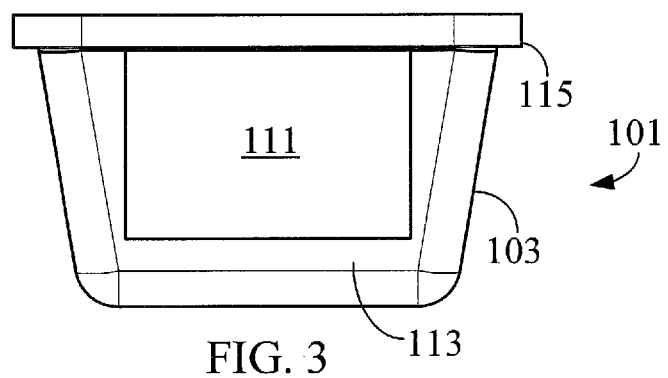
FIG. 3 is a front view of the storage container of FIG. 1.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present application is directed to a storage container that is configured to solve the problem of identifying the internal contents without the need to open the container or easily view the identification member at a distance of six feet or less. Furthermore, an object of the present application is to provide a way to protect an identification member from external and internal elements that would prematurely cause removal of the identification member and/or cause the premature damage of the identification member.

The identification member may be a card or insert that provides information concerning the content of the storage container through visual indicia, such as words, pictures, graphs, barcodes, and so forth. In some embodiments, the identification member may be an electronic device to store and transmit data. Discussion of the embodiments of the present application are discussed below.

Referring now to FIGS. 1-4B in the drawings, a storage container is illustrated. Storage container 101 includes a container 103 configured to hold elements or items, and a sleeve 105 configured to accept an identification member 107 through an opening 109. Elements or items contained within container 103 may be anything including: paper, fabric, paint cans, tools, liquids, apparel, and so forth. The elements or items may contribute to produce fumes, moisture, and debris within container 103, all of which may work to damage identification member 107 without the protection of sleeve 105.

Container 103 is preferably made from a plastic based material that provides increased strength over typical paper based boxes. The material can be fiber reinforced in some embodiments. Examples of the material used to form container 103: fiberglass, plastic, hardened or stiffened rubber, and so forth. The material is not limited to these examples and other materials are herein envisioned for use. The material is preferably tinted, or includes a pigment, to restrict visual inspection from the exterior. Furthermore, the tint may also include reflective or protective coating to repel harmful sunlight. Container 103 may be transparent in other embodiments.

Sleeve 105 is internally coupled to an outer wall 113 of container 103. Sleeve 105 is preferably shaped and contoured to have a single opening 109 to receive identification member 107. Opening 109 is preferably located along an upper portion of sleeve 109 to allow for identification member 107 to rest securely within sleeve 105. However, other embodiments may allow one or more sides or portions of sleeve 105 to contain opening 109.

Sleeve 105 is configured to provide an interior position within container 103 to hold identification member 107, and seal identification member 107 from the interior elements of container 103. For instance, when items having moisture, fumes, or debris are located within container 103, such items may lead to the premature damage of identification member 107 when stored if not for sleeve 105 providing a sealed environment. Although described as locating sleeve 105 internally within an interior of container 103, other embodiments may locate sleeve 105 externally along outer wall 113, wherein outer wall 113 provides a barrier between interior elements and identification member 107.

Sleeve 105 is fully integrated into outer wall 113 of container 103, such that sleeve 105 and container 103 are a single unitary piece. In FIGS. 1-4B, sleeve 105 is molded onto an interior face 117 of outer wall 113, there being a seamless transition between the two. The seamless transition from sleeve 105 and container 103 operate to ensure a complete seal and minimize the possibility of leaks. In other embodiments, sleeve 105 may be coupled to container 105 via one of many different types of methods: adhesive, fasteners, interference fit using slots, and so forth. Each of these methods may also form a sealed transition between sleeve 105 and container 103, however, such a transition may be more susceptible to leaks.

Identification member 107 is located between sleeve 105 and outer wall 113. Container 103 is configured to maintain a window 111 along outer wall 113 to permit a user the ability to visually inspect identification member 107. Window 111 is a portion of outer wall 113 adjacent a portion of sleeve 105 wherein the tint or pigment is removed to permit a transparent portion. Window 111 is fully integrated into outer wall 113 and does not require the coupling of an additional member. Outer wall 113 serves to protect identification member from contact with external objects. Furthermore, outer wall 113 acts to protect identification member 107 from exterior elements, such as moisture, moving objects, debris, gaseous fumes, and sunlight for example. Reference to sleeve 105 from this point forward will include the inwardly protruding portion of sleeve 105 and also outer wall 113 in order to ease description of the various embodiments.

Storage container 101 may also include a lid 115 configured to selectively close a portion of the open container 103. Lid 115 is removably coupled to container 103. Lid 115 is configured to sealingly engage opening 109, when coupled to container 103, to ensure a proper seal. When lid 115 is closed, identification member 107 is completely sealed on all sides within the interior of sleeve 105 and lid 115. In such a configuration, sleeve 105 is configured to be selectively sealed such that the interior of sleeve 105 is isolated from the interior of container 103 and the exterior of container 103.

Figure 4A:
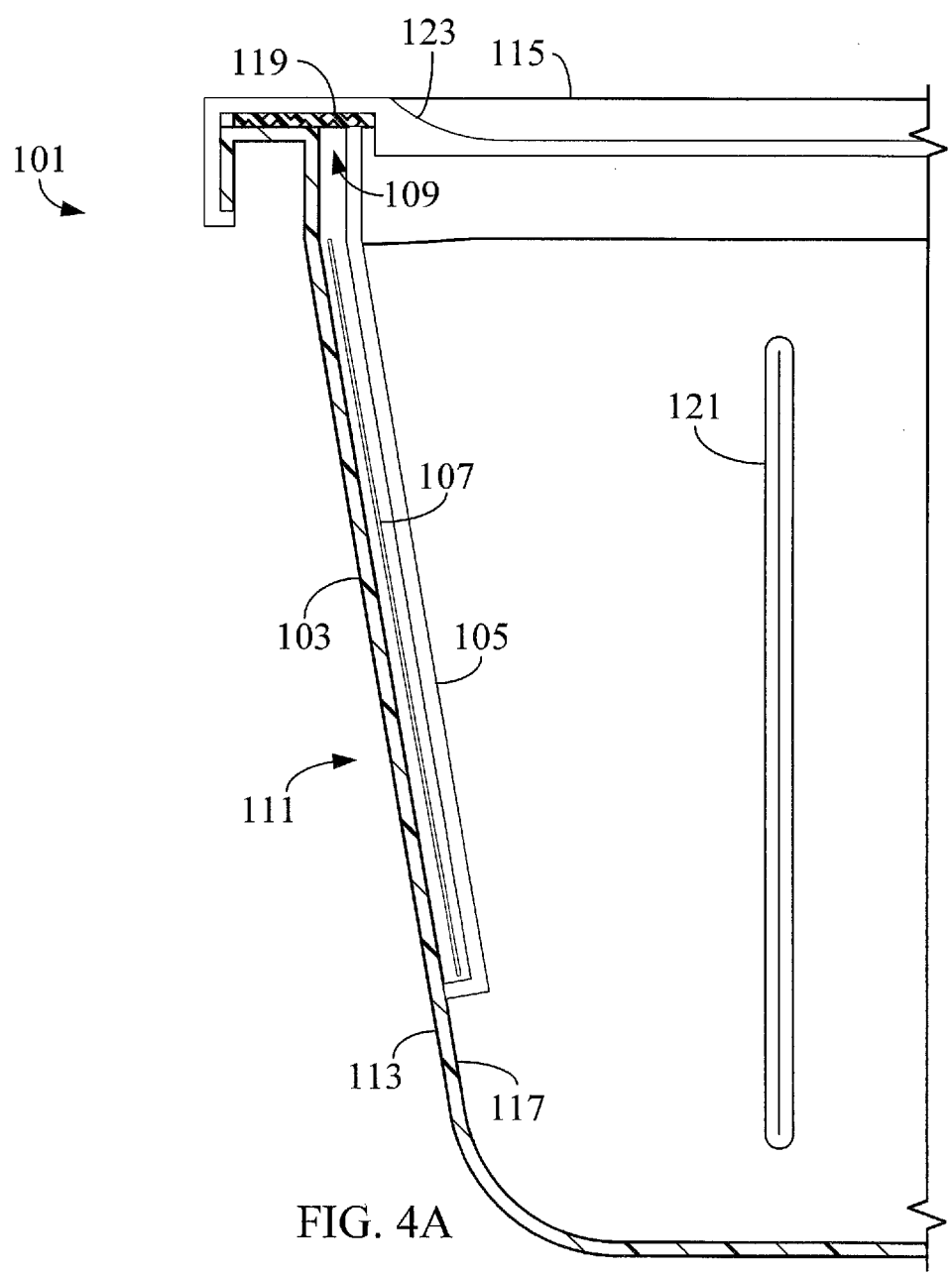
FIG. 4A is a section view of the storage container to illustrate the identification member according to the preferred embodiment of the present application.
Figure 4B:
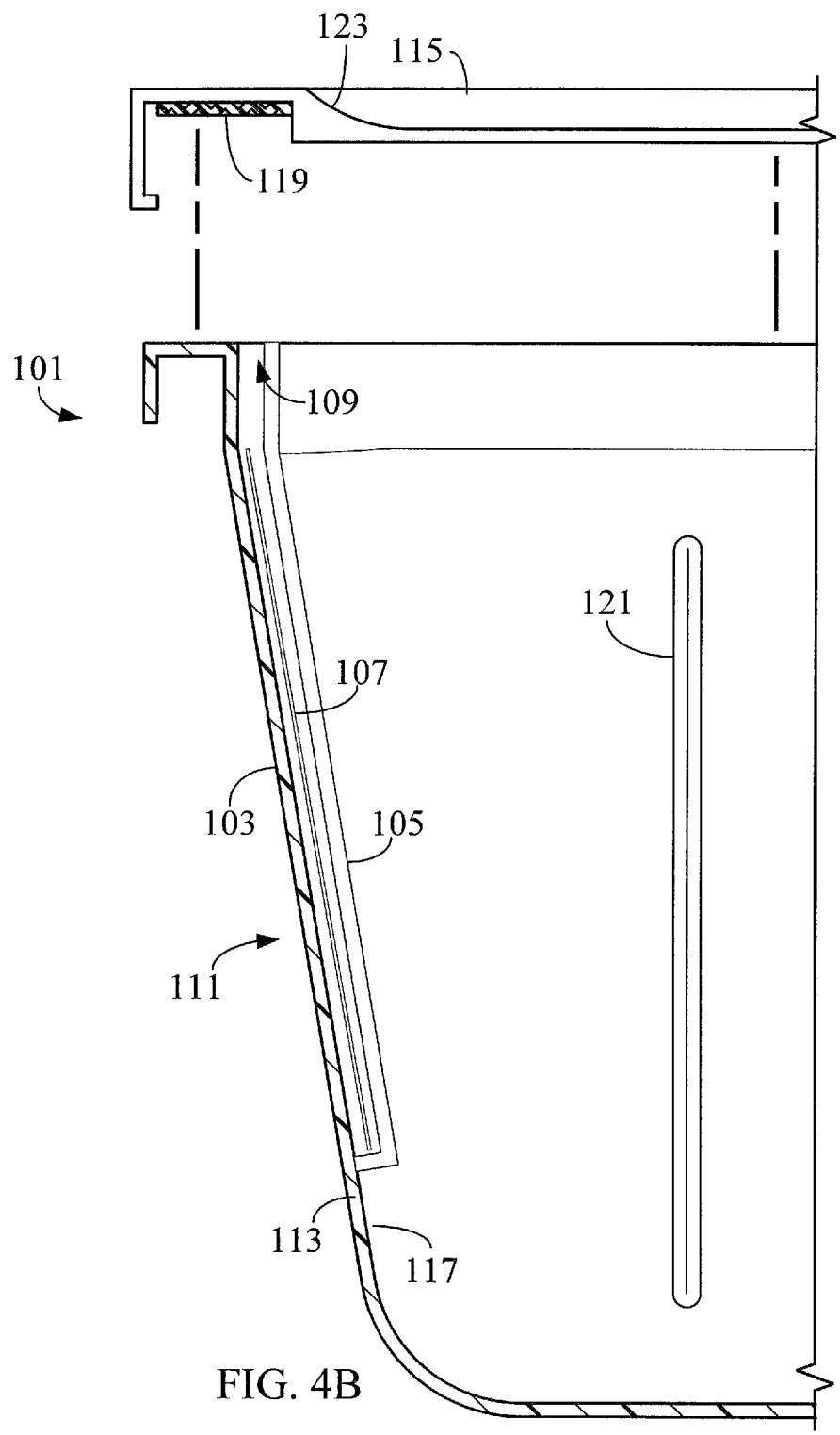
FIG. 4B is a section view as seen in FIG. 4A, wherein a lid is separated from the storage container.

In FIGS. 4A and 4B, sleeve 105 is flush with the top of container 103. It is understood that sleeve 105 may extend upward along outer wall 113 to any height. Lid 115 is contoured to extend across opening 109 at any height to ensure a proper seal.

Lid 115 may also include an elastomeric member 119 to extend across opening 109 to further ensure a sealed opening 109. Elastomeric member 119 would be coupled to lid 115. Additionally, as seen in FIGS. 4A and 4B, elastomeric member 119 can be configured to extend around the perimeter of lid 115 and sealingly engage container 103 as well as opening 109. In such an embodiment, elastomeric member 119 is configured to seal opening 109 and also seal the interior of container 103 from the interior of sleeve 105 and the exterior of container 103. The result is two sealed environments: sleeve 105 and the interior of container 103.

Container 103 may also further include one or more ribs 121 configured to assist in the organization of items within the interior of container 103. Ribs 121 are protrusions selectively contoured to accept one or more trays or compartmental organizers to segregate portions of container 103. Ribs 121 may be located on any interior surface of the container 103 and also an interior surface of lid 115.

It is noted that storage container 101 is contoured, container 103 and lid 115, so as to interlock in a stacked configuration. For example, the recess 123 within lid 115 is sized to accept the base of container 103. By nestling multiple containers and lids on top of one another, storage container 101 is configured to securely stack on top of one another.

Figure 5:
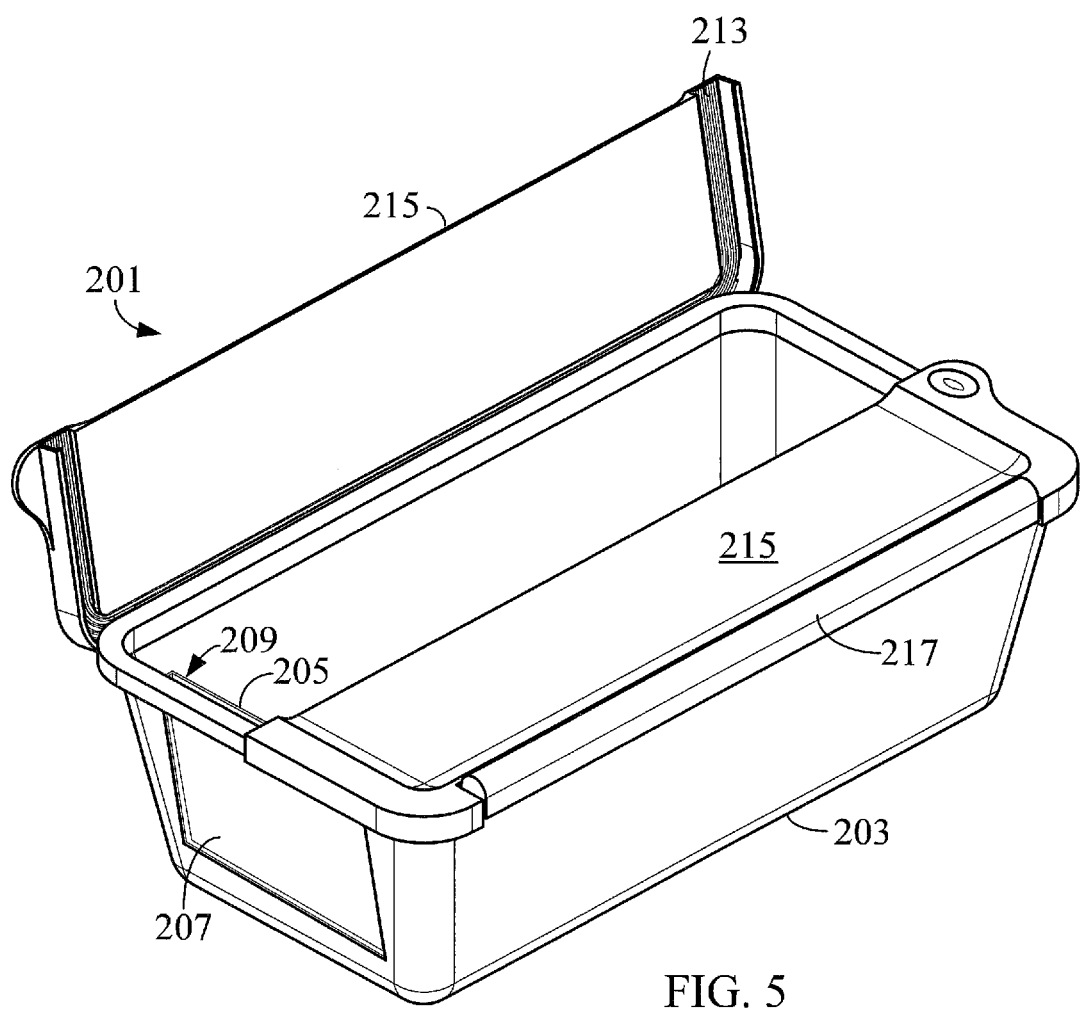
FIG. 5 is a perspective view of an alternative embodiment of the storage container of FIG. 1.
Figure 6:
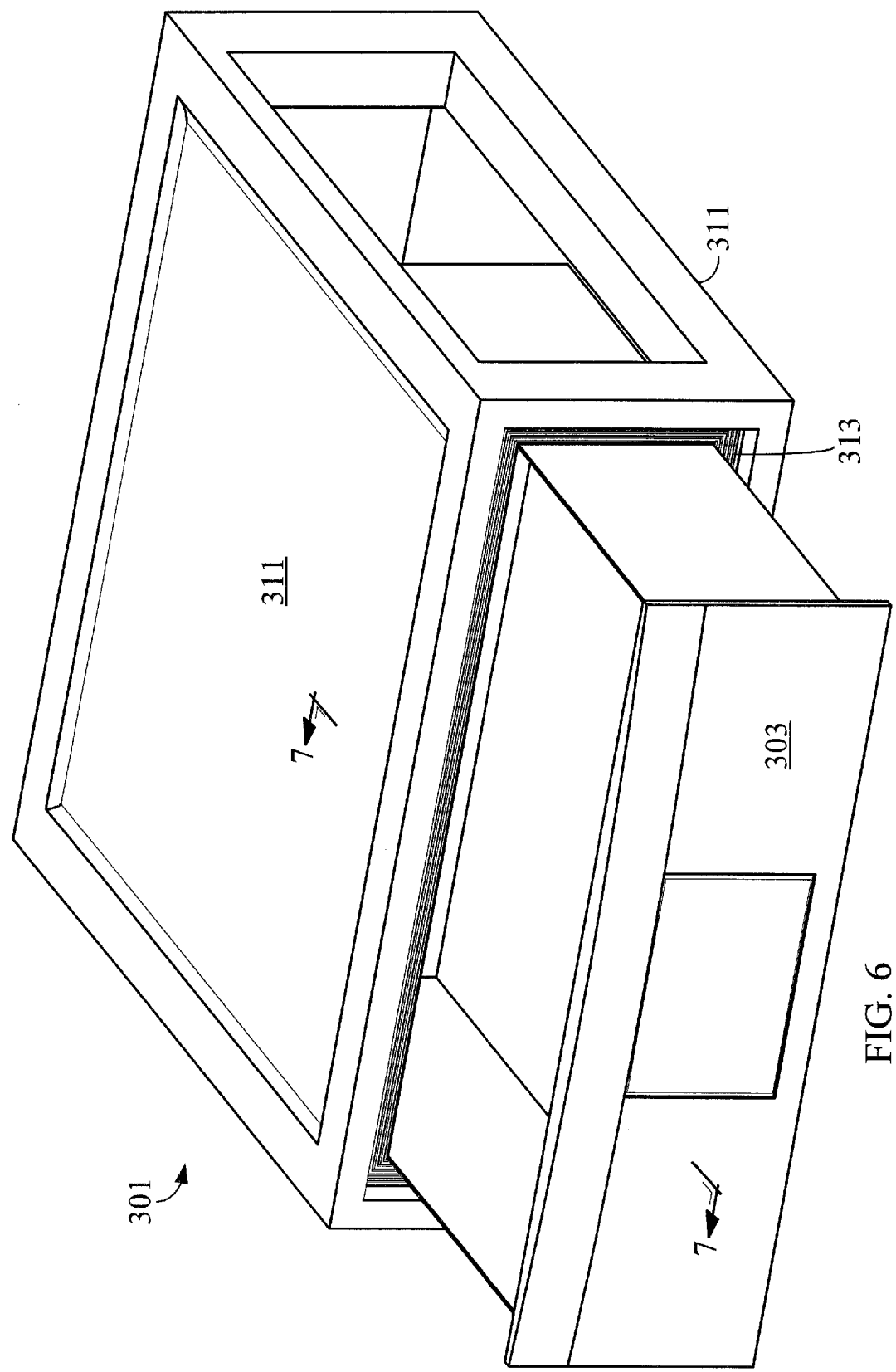
FIG. 6 is a perspective view of another alternative embodiment of the storage container of FIG. 1.

Referring now also to FIGS. 5 and 6 in the drawings, an alternative embodiment of the storage container of FIG. 1 is illustrated. Storage container 201 is similar in form and function to that of storage container 101. In particular storage container 201 includes a container 203, a sleeve 205 configured to accept an identification member 207 through an opening 209. Sleeve 205 is configured to be sealed as described with sleeve 105. The single difference between storage container 101 and storage container 201 is the operation of lid 215.

Lid 215 is hingedly coupled to container 203 through hinge 217. Lid 215 is separated in two-halves in FIG. 5. Each half has a set of hinges 217. One hinge 217 is visible in FIG. 5. Lid 215 optionally includes the use of elastomeric member 213. Elastomeric member 213 has the same functions, features, and limitations as elastomeric member 119 except that the member 213 is divided equally between the two halves of lid 215. It is understood that other types of lids are conceivable and considered within the scope of this disclosure, such as lids with carry handles. Additionally, other means besides hinge 217 may be used to pivot lid 215 about a portion of container 201.

Figure 7:
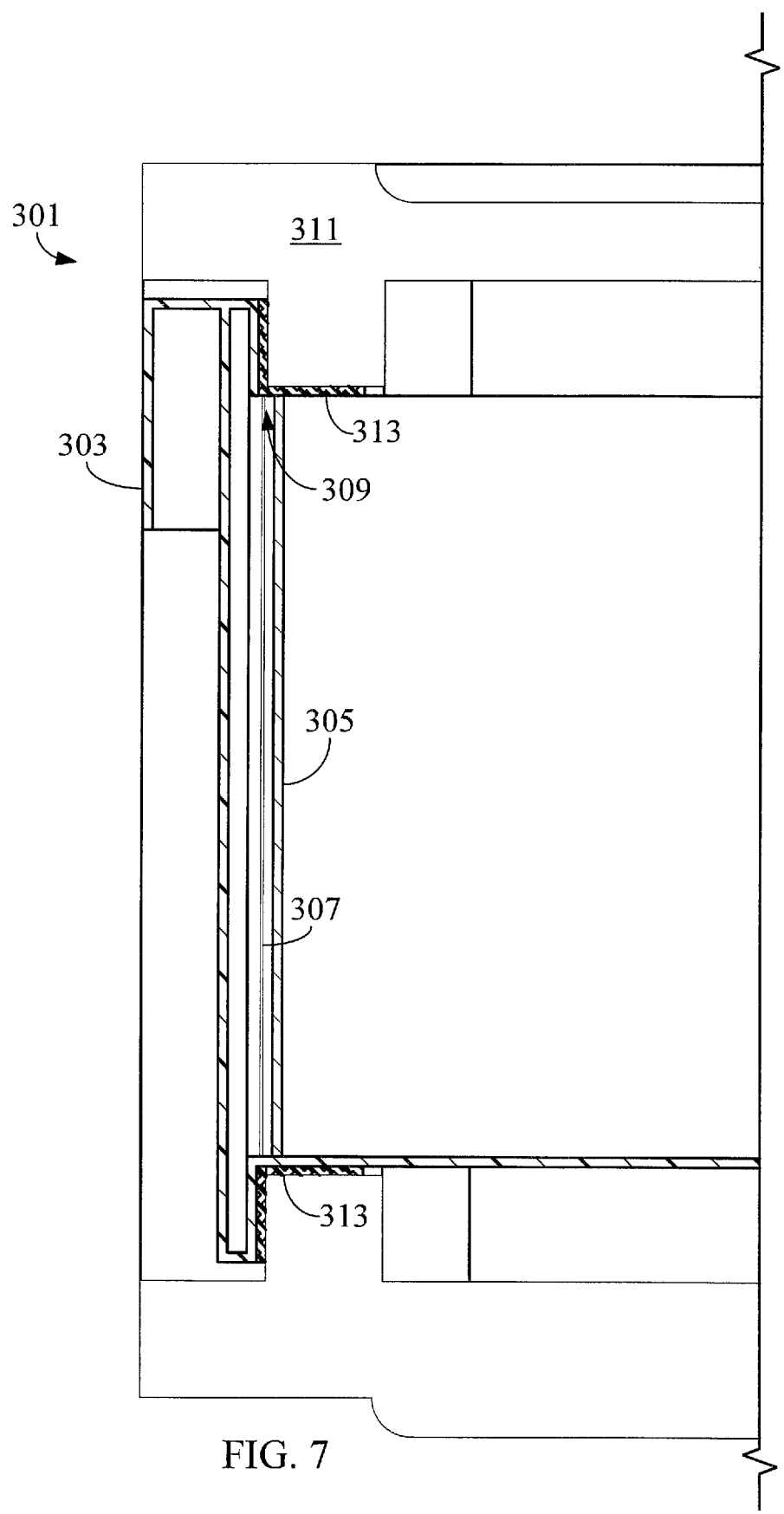
FIG. 7 is a section view of the storage container of FIG. 6.

Referring now also to FIGS. 6 and 7 in the drawings, another alternative embodiment of the storage containers of FIGS. 1 and 5 is illustrated. Storage container 301 is similar in form, features, and limitations to storage containers 101 and 201 described above. Storage container 301 includes a container 303, a sleeve 305 configured to accept an identification member 307 through an opening 309. The interaction and functions of container 303 and sleeve 305 are similar to that of container 103 and sleeve 105 respectively.

The difference between storage container 301 and storage container 101 is in how container 303 is operated. Wherein previously with respect to storage containers 101 and 201, the sealing and breaking of the sealed environment of the sleeve was performed by applying a force to a separate element (i.e. lid 115, 215); in this embodiment the sealing and breaking of the sealed environment of the sleeve is performed by applying a force to the container and/or sleeve directly. Container 303 is configured to act as a drawer in which container 303 is configured to slide or translate into and out of a body 311. An elastomeric member 313 is configured to selectively seal the interior of sleeve 305 from the interior of container 303 and the exterior of container 303. Elastomeric member 313 is coupled to body 311, such that member 313 sealingly engages opening 309 when container 303 is in a closed position as seen in FIG. 7. It is understood that container 303 may be hingedly coupled to body 311 in other embodiments, such that sleeve 305 tilts away from body 311.

Figure 8:
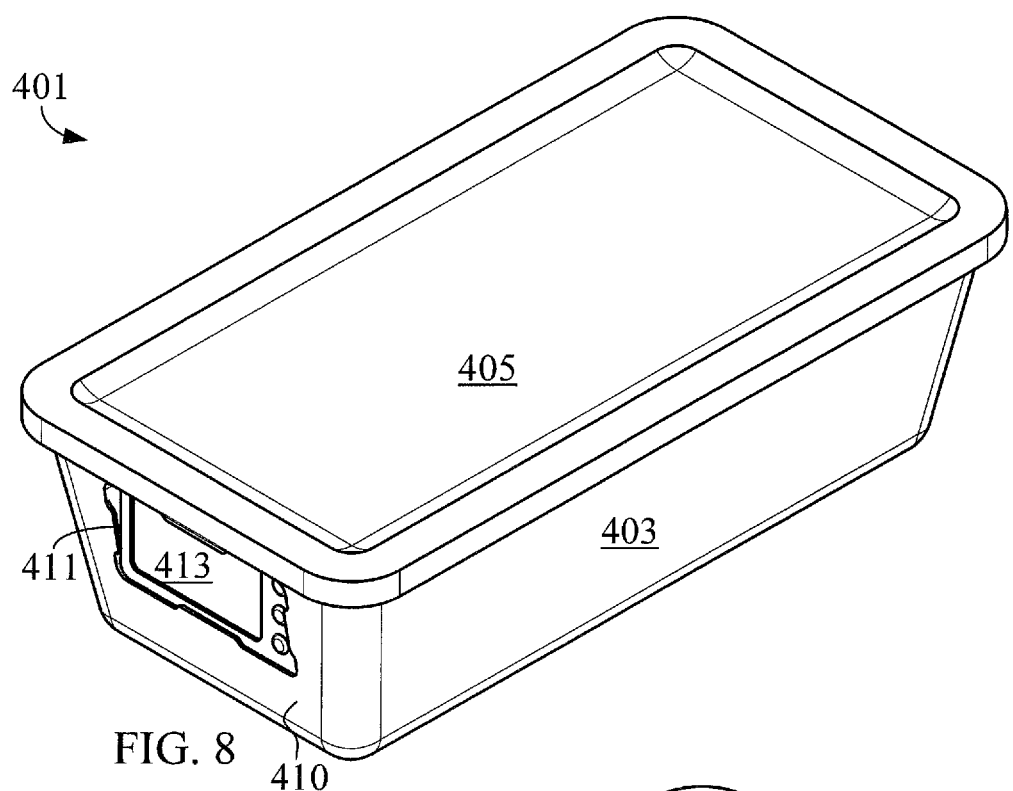
FIGS. 8 and 9 are perspective views of a storage container system utilizing an alternative identification member to identify the contents of the container.
Figure 9:
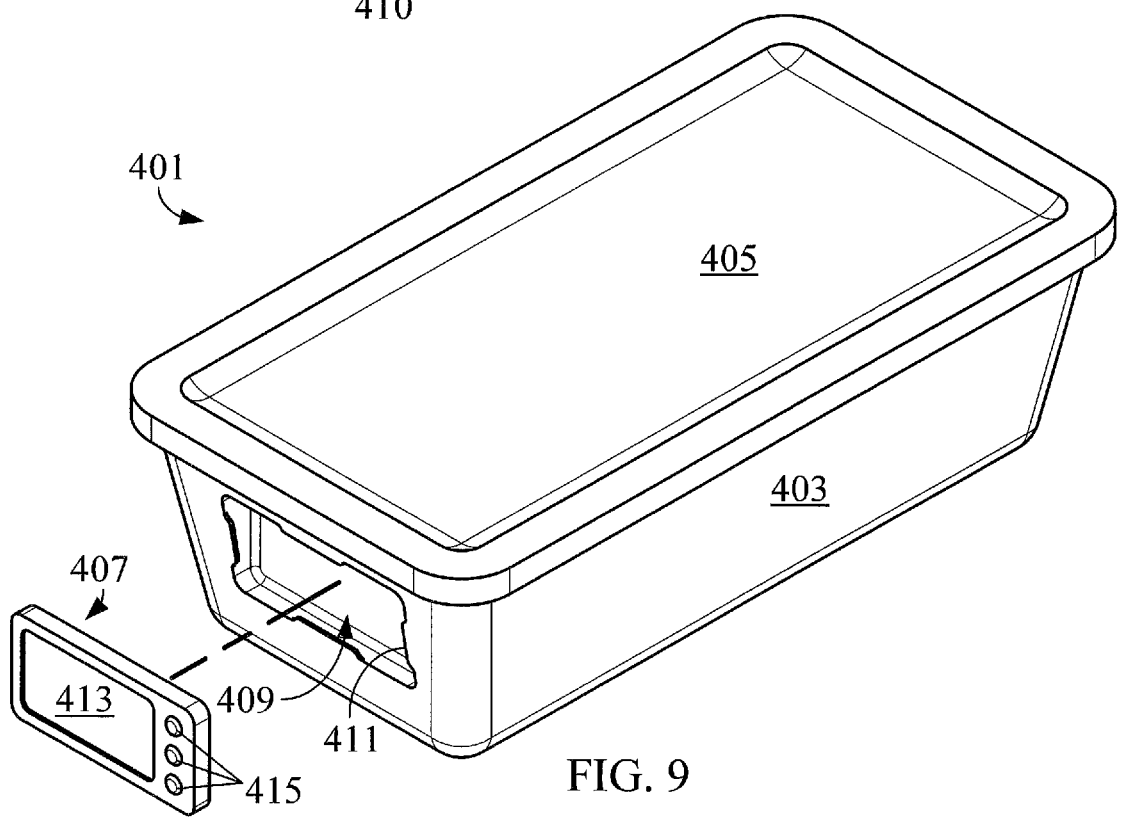
Figure 10:
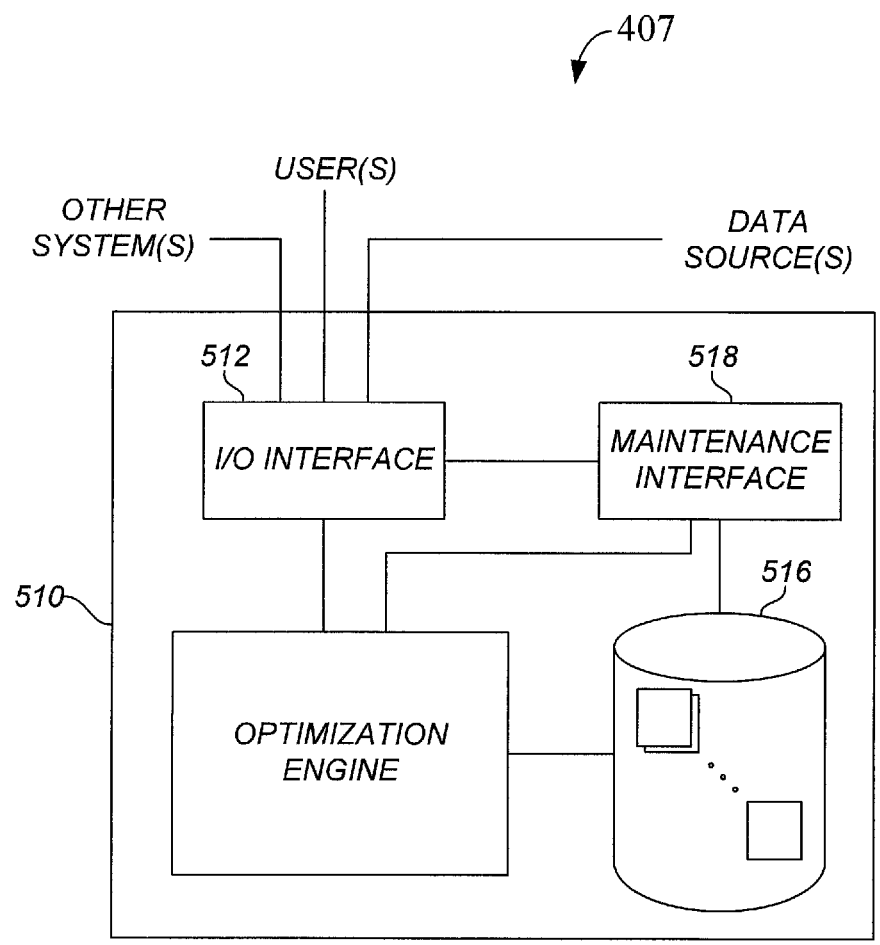
FIG. 10 is an exemplary drawing of the identification member of FIGS. 8 and 9.

Referring now also to FIGS. 8-10 in the drawings, a storage container system is illustrated. Storage system 401 is configured to satisfy the same issues presented with and solved by storage containers 101, 201 and 301. However, storage system 401 is configured to provide an alternative identification member 407. Storage system 401 includes a container 403 configured to hold elements or items and identification member 407. A lid 405 is optionally included with storage container system 401. Lid 405 is configured to releasably couple to container 403. Container 403 also optionally includes ribs as disclosed with FIG. 1. Although illustrated with a container similar to that of container 103, it is understood that containers similar to containers 203 and 303 may be utilized and adapted for use with member 407.

Identification member 407 is an electronic information device configured to provide data concerning the contents of container 403. Member 407 includes a display 413 for providing information concerning the content of the storage container through visual indicia, such as words, pictures, graphs, barcodes, and so forth. For example a QVC code, barcode, picture, or words may be shown on display 413. Additionally, member 407 may also provide content information via audible means. One or more control buttons 415 are available to operate member 407.

As seen in particular in FIG. 10, a diagram of identification member 407 is illustrated. FIG. 10 is an exemplary illustration of storage, computational, operational, and interface abilities of member 407. Member 407 includes an input/output (I/O) interface 512, a database 516, and a maintenance interface 518. Alternative embodiments can combine or distribute the input/output (I/O) interface 512, database 516, and maintenance interface 518 as desired. Embodiments of member 407 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines that are suitable for also performing other tasks. Furthermore the computers may use transitory and non-transitory forms of computer-readable media. Non-transitory computer-readable media is to be interpreted to comprise all computer-readable media, with the sole exception of being a transitory, propagating signal.

The I/O interface 512 provides a communication link between external users, systems, and data sources and components of member 407. The I/O interface 512 can be configured for allowing one or more users to input information to member 407 via any known input device. Examples can include a keyboard, mouse, touch screen, microphone, cell phone, and/or any other desired input device. The I/O interface 512 can be configured for allowing one or more users to receive information output from member 407 via any known output device. Examples can include a display monitor, a printer, a speaker, a cell phone and/or any other desired output device. The I/O interface 512 can be configured for allowing other systems to communicate with member 407. For example, the I/O interface 512 can allow one or more remote computer(s) to access information, input information, and/or remotely instruct member 407 to perform one or more of the tasks described herein. The I/O interface 512 can be configured for allowing communication with one or more remote data sources. For example, the I/O interface 512 can allow one or more remote data source(s) to access information, input information, and/or remotely instruct member 407 to perform one or more of the tasks described herein.

The database 516 provides persistent data storage for member 407. While the term "database" is primarily used, a memory or other suitable data storage arrangement may provide the functionality of the database 516. In alternative embodiments, the database 516 can be integral to or separate from member 407 and can operate on one or more computers. The database 516 preferably provides non-volatile data storage for any information suitable to support the operation of member 407, including various types of data discussed in connection with FIGS. 8-9.

The maintenance interface 518 is configured to allow users to maintain desired operation of member 407. In some embodiments, the maintenance interface 518 can be configured to allow for reviewing and/or revising the data stored in the database 516 and/or performing any suitable administrative tasks commonly associated with database management. This can include, for example, updating database management software, revising security settings, and/or performing data backup operations. In some embodiments, the maintenance interface 518 can be configured to allow for maintenance of member 407 and/or the I/O interface 512. This can include, for example, software updates and/or administrative tasks such as security management and/or adjustment of certain tolerance settings.

Member 407 is releasably coupled to container 403 through interference fit. A cavity 409 is formed as a recess in a wall 410 of container 403 and is contoured to accept member 407. Member 407 is press-fit into cavity 409 through the application of a force supplied from a user. To remove, a force is applied to member 407 to dislodge the interference fit between member 407 and cavity 409. By locating member 407 within cavity 409, member 407 is protected from passing objects which may dislodge member 407 from container 403. Cavity 409 optionally includes one or more tabs 411 to help prevent the undesired detachment of member 407 from container 403.

As an electronic device, member 407 is configured to receive electrical power from a power source, so as to recharge stored electrical energy within 407. Member 407 is configured to maintain stored energy, such as a battery. Recharging may be performed when detached from container 403 or when docked in cavity 409 through one or more wires and contacts selectively coupled to member 407. For example, container 403 may include an exterior outlet affixed to wall 410 for connection to a power source. A contact port may be located along a lower surface within cavity 409 and be aligned to engage a corresponding contact port on a lower surface of member 407. The contact port within cavity 409 may be in electrical communication with the exterior outlet through one or more wires.

As discussed with the previous embodiments, container 403 and lid 405 are contoured, so as to interlock in a stacked configuration. When stacked, multiple storage systems 401 may be configured to share electrical power. In other words, exterior outlets from adjacent containers 403 may be coupled together through one or more wires to allow for electrical power to be transferred from one exterior outlet on a first container 403 to another exterior outlet on a second container 403.

In operation, storage container system is loaded with selected items for storage or transportation. The container is then sealed or closed. An electronic identification member is selected and information concerning the contents of the container are uploaded into the electronic member. Detailed information such as weight, destination, expiration dates, cost/pricing data, inventory management, and so forth may be included and stored into the electronic member. The electronic member is then secured in the cavity of the container through interference fit. The electronic member may be optionally connected to an external power source. At any time, a user may visit and access the electronic member to view the contents and details through operation of the buttons, display, or other electronic device. It is understood that the electronic member may be able to sync with mobile phones or other mobile devices that permit pictures to be transferred. In this case, a user may take a picture of the contents (i.e. shoes) and upload them wirelessly to the electronic member for display on display 413. A user may also choose to generate and display coded images such as barcodes and/or QVC codes that are representative of the contents and associated details. The coded images permit quick access to details concerning the contents within the container and for the fast transfer of that data to another electronic device. Because each electronic member is portable and detachable from the cavity, a user may choose to exchange one electronic device for another. Where multiple storage containers are used, a single electronic member is capable of storing data concerning multiple containers individually.

The current application has many advantages over the prior art including at least the following: (1) an identification member sealed in an isolated environment free from contamination from items in the container or external to the container; (2) detachable electronic information device; (3) ability to upload and track scanned contents and content details without opening the container.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A storage container, comprising:
   a container configured to hold elements, the container having a plurality of distinct outer walls;
   a lid configured to selectively close a portion of the container;
   a sleeve coupled to an inner surface of one of the outer walls of the container along a plurality of edges, the sleeve being a protrusion from the outer wall having a single opening along an upper portion of the sleeve, the outer wall having a transparent portion to form a window permitting visual inspection within the sleeve, the sleeve configured to accept an identification member through the opening; and
   a seal coupled to the lid and configured to sealingly engage the sleeve opening so as to isolate the internal environment of the sleeve from the interior environment of the container and the exterior of the container such that the internal environment of the sleeve is not contaminated by the interior environment of the container and the exterior environment;
   wherein the lid is configured to selectively close the sleeve opening, the seal is configured to contact and seal the interior of the container and the sleeve opening simultaneously, the seal contacting only a top surface of the sleeve and the outer walls;
   wherein closure of the lid onto the container creates a seal around the entire periphery of the opening.

2. The storage container of claim 1, wherein the container includes a rib configured to assist in the organization of items within the interior of the container.

3. The storage container of claim 1, wherein the sleeve is molded into the outer wall of the container.

4. The storage container of claim 1, wherein the lid is removable from the container.

5. The storage container of claim 1, wherein the lid is hingedly coupled to the container.

6. The storage container of claim 1, wherein the container and lid are contoured to interlock in a stacked configuration.

7. The storage container of claim 1, wherein the selective sealing of the sleeve is performed by an elastomeric member.

8. The storage container of claim 7, wherein the elastomeric member is coupled to a portion of the lid.

9. The storage container of claim 7, wherein the elastomeric member is configured to extend around the perimeter of the lid and sealingly engage the container, the elastomeric member configured to isolate the interior of the container from the interior of the sleeve and the exterior of the container.

* * * * *